United States Patent Office 3,637,880
Patented Jan. 25, 1972

3,637,880
ISOMERIZATION OF PSUEDOCUMENE
George T. Burress, Beaumont, Tex., assignor to
Mobil Oil Corporation
No Drawing. Filed June 4, 1970, Ser. No. 43,602
Int. Cl. C07c 5/24
U.S. Cl. 260—668 A                7 Claims

ABSTRACT OF THE DISCLOSURE

Pseudocumene is isomerized to mesitylene in the presence of a xylene diluent and a crystalline aluminosilicate catalyst.

RELATED APPLICATIONS

Application Ser. No. 133,571, filed Apr. 13, 1971, in the names of James L. Willis, Jr., and Philip Grandio, Jr., relates to the isomerization of alkyl aromatic hydrocarbons in the presence of an aromatic diluent and a crystalline alumino-silicate catalyst.

BACKGROUND OF THE INVENTION

Field of the invention

The present invention relates to the use of a xylene diluent to achieve selectivity in the isomerization of pseudocumene to mesitylene in the presence of a crystalline aluminosilicate catalyst.

Description of the prior art

The catalytic intra and/or inter rearrangement of alkyl groups present in alkyl aromatic hydrocarbons to provide one or more products suitable for use in the petroleum and chemical industries has heretofore been effected by a wide variety of catalysts. Acidic halides such as aluminum chloride, aluminum bromide, boron trifluoride-hydrogen fluoride mixtures, etc. have been used in the rearrangement of alkyl benzenes to provide valuable intermediates which find utility in the synthesis of rubber, plastic, fibers and dyes. Other catalysts which have been used include solid siliceous cracking-type catalysts such as silica-alumina and clays. Although various catalysts possess one or more desired characteristics, a majority of the catalysts heretofore employed suffer from several disadvantages. Acidic halides such as aluminum chloride, for example, are partially soluble in the feed material and are easily lost from the catalyst zone. Catalysts of this type are also uneconomical because of their extreme corrosiveness and requirement for recovery from the effluent products. Other catalysts of the heterogeneous type, such as silica-alumina, do not possess sufficient acidity to provide effective conversion and necessitate the use of relatively high temperatures above the order of 800° F. High temperatures frequently lead to coke formation which lowers the yield of desired product and necessitates frequent regeneration of the catalyst to remove coke. This results in reducing on-stream time and leads to high catalyst consumption due to loss of catalyst activity. Heterogeneous catalysts such as the crystalline aluminosilicates, both natural and synthetic, possess sufficient acidity but suffer the disadvantage of poor selectivity and aging as evidenced by "coke" make and the excessive amounts of disproportionated products formed in isomerization reactions.

SUMMARY

The invention relates to the use of 15 to 35% by weight xylene as a diluent to increase selectivity in the isomerization of pseudocumene to mesitylene. The isomerization reaction is carried out in the presence of a crystalline aluminosilicate catalyst which has a pore size of greater than 5 angstrom units such as zeolites X, Y, mordenite, beta and ZSM-4. Because members of the family of zeolites designated as ZSM-4 possess extraordinary selectivity, such materials are especially preferred.

PREFERRED EMBODIMENT

The preferred crystalline aluminosilicates used for purposes of the invention are designated as "Zeolite ZSM-4" or simply "ZSM-4." ZSM-4 compositions can be identified in terms of mole ratios of oxides as follows:

$$0.9 \pm 0.2 M_{\frac{2}{n}}O : W_2O_3 : 3\text{--}20 YO_2 : zH_2O$$

wherein M is a cation, $n$ is the valence of said cation, W is selected from the group consisting of aluminum and gallium, Y is selected from the group consisting of silicon and germanium, and $z$ is from 0 to 20. In the as synthesized form the zeolite has a formula, in terms of mole ratios of oxides as follows:

$$0.9 \pm 0.2 M_{\frac{2}{n}}O : Al_2O_3 : 3\text{--}20 SiO_2 : zH_2O$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2 [xR_2O + (1-x)M_{\frac{2}{n}}O] : W_2O_3 : 3\text{--}20 YO_2 : 0\text{--}20 H_2O$$

where W and Y have the previously assigned significance, R is tetramethylammonium, M is an alkali metal cation and $x$ is between 0.01 and 0.50.

The original cations can be replaced, at least in part, by ion exchange with another cation. Preferably, the other cation is selected from the group consisting of alkylammonium, e.g. tetramethylammonium, arylammonium, metals, ammonium, hydrogen thermally treated products of ammonium and/or hydrogen, or combinations of any of these cations. Particularly, preferred cations include hydrogen, rare earth metals, aluminum, metals of Groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700° F. In a preferred embodiment of ZSM-4, W is aluminum, Y is silicon and the silica/alumina mole ratio is at least 5 and ranges up to about 15.

Members of the family of ZSM-4 zeolites possess a definite distinguishing crystalline structure whose X-ray diffraction pattern has the following values:

TABLE 1

| Interplanar spacing $d$ (A): | Relative intensity |
|---|---|
| 2.92±.05 | vs |
| 9.1±.2 | mw |
| 7.94±.1 | m |
| 6.90±.1 | s |
| 5.97±.07 | mw |
| 5.50±.05 | mw |
| 5.27±.05 | mw |
| 4.71±.05 | w |

TABLE 1.—Continued

| Interplanar spacing d (A): | Relative intensity |
|---|---|
| 4.39±.05 | w |
| 3.96±.05 | s |
| 3.80±.05 | m |
| 3.71±.05 | m |
| 3.63±.05 | s |
| 3.52±.05 | m |
| 3.44±.05 | s |
| 3.16±.05 | m |
| 3.09±.05 | m |
| 3.04±.05 | m |
| 2.98±.05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A., corresponding to the recorded lines, were calculated. In Table 1 the relative intensities are given in terms of the symbols s=strong, m=medium, ms=medium strong, mw=medium weak and vs=very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray powder diffraction patterns of several of these forms are set forth below. The ZSM-4 forms set forth below are all aluminosilicates.

| NaTMAZSM-4 | | NaTMAZSM-4 | | HZSM-4 | | ZnNaTMAZSM-4 | |
|---|---|---|---|---|---|---|---|
| d (A.) | I/I₀ | d (A.) | I/I₀ | d (A.) | I/I₀ | d (A°) | I/I₀ |
| 17.5 | 2 | 17.6 | 5 | | | | |
| 16.0 | 17 | 16.1 | 20 | 15.8 | 12 | 16.1 | 6 |
| 9.18 | 100 | 9.19 | 100 | 9.12 | 100 | 9.21 | 79 |
| 7.96 | 21 | 7.96 | 20 | 7.88 | 49 | 7.97 | 40 |
| | | 7.34 | 3 | | | | |
| 6.94 | 12 | 6.93 | 30 | 6.85 | 24 | 6.92 | 36 |
| 6.01 | 34 | 6.01 | 33 | 5.95 | 62 | 6.01 | 60 |
| 5.53 | 4 | 5.53 | 7 | 5.47 | 10 | 5.53 | 6 |
| 5.29 | 8 | 5.29 | 7 | 5.25 | 10 | 5.29 | 15 |
| 4.73 | 30 | 4.72 | 31 | 4.69 | 19 | 4.73 | 51 |
| | | | | 4.54 | 7 | | |
| 4.41 | 4 | 4.39 | 4 | 4.37 | 23 | 4.40 | 9 |
| 4.12 | 5 | 4.19 | 1 | | | | |
| 3.97 | 13 | 3.95 | 11 | 3.94 | 20 | 3.97 | 18 |
| 3.82 | 67 | 3.81 | 69 | 3.78 | 52 | 3.82 | 100 |
| 3.74 | 11 | 3.72 | 28 | 3.69 | 14 | 3.72 | 36 |
| 3.64 | 31 | 3.63 | 26 | 3.61 | 13 | 3.64 | 24 |
| 3.54 | 30 | 3.53 | 54 | 3.50 | 28 | 3.53 | 72 |
| 3.46 | 7 | 3.45 | 14 | 3.42 | 12 | 3.45 | 15 |
| 3.28 | 4 | 3.28 | 5 | | | | |
| 3.17 | 73 | 3.16 | 48 | 3.15 | 43 | 3.17 | 60 |
| 3.10 | 12 | 3.10 | 23 | 3.07 | 14 | 3.10 | 27 |
| 3.05 | 25 | 3.04 | 21 | 3.03 | 20 | 3.05 | 27 |
| 2.99 | 14 | 2.99 | 13 | 2.97 | 10 | 3.00 | 18 |
| 2.93 | 43 | 2.92 | 48 | 2.91 | 29 | | |
| 2.83 | 4 | 2.83 | | 2.81 | 1 | | |
| 2.775 | 1 | | | 2.77 | 1 | | |
| 2.67 | 3 | 2.67 | 2 | | | 2.66 | 9 |
| 2.65 | 6 | 2.65 | 3 | 2.64 | 7 | 2.64 | 8 |
| 2.63 | 5 | 2.63 | 3 | 2.61 | 3 | 2.57 | 2 |
| 2.56 | 1 | 2.55 | 2 | 2.55 | 1 | 2.53 | 8 |
| 2.52 | 6 | 2.52 | 3 | 2.52 | 5 | 2.51 | 2 |
| 2.49 | 4 | 2.48 | 2 | 2.49 | 2 | 2.48 | 1 |
| 2.43 | 1 | 2.41 | 1 | 2.42 | 1 | 2.42 | 2 |
| 2.40 | 3 | 2.395 | 2 | 2.39 | 1 | 2.39 | 6 |
| 2.38 | 5 | 2.37 | 2 | 2.36 | 2 | 2.35 | 1 |
| 2.34 | 1 | 2.30 | 1 | | | 2.29 | 4 |
| 2.28 | 7 | 2.27 | 2 | 2.27 | 3 | 2.265 | 2 |
| 2.19 | 2 | | | 2.18 | 2 | 2.17 | 4 |
| 2.17 | 1 | | | 2.15 | 2 | 2.145 | 3 |
| 2.14 | 3 | 2.14 | 2 | 2.125 | 3 | 2.115 | 3 |
| 2.10 | 4 | 2.10 | 2 | 2.10 | 3 | 2.10 | 2 |
| 2.09 | 2 | 2.08 | 1 | 2.07 | 1 | 2.06 | 3 |
| 2.04 | 1 | 2.03 | 1 | 2.02 | 2 | 2.015 | 1 |
| 2.02 | 3 | 2.015 | 1 | 2.01 | 1 | 2.00 | 6 |
| 1.99 | 6 | 1.98 | 4 | 1.98 | 3 | 1.97 | 6 |

| RENaZSM-4 | | CaNaTMAZSM-4 | | MgNaTMAZSM-4 | |
|---|---|---|---|---|---|
| d (A.) | I/I₀ | d (A.) | I/I₀ | d (A.) | I/I₀ |
| | | 17.5 | 8 | | |
| | | 15.8 | 38 | 16.1 | 17 |
| 9.12 | 87 | 9.10 | 100 | 9.07 | 100 |
| 7.93 | 8 | 7.90 | 11 | 7.93 | 28 |
| 6.89 | 42 | 6.88 | 43 | 6.89 | 36 |
| 5.97 | 71 | 5.96 | 55 | 5.98 | 64 |
| 5.49 | 5 | 5.49 | 13 | 5.50 | 7 |
| 5.27 | 10 | 5.26 | 10 | 5.29 | 17 |
| 4.79 | 8 | 4.92 | 3 | | |
| 4.70 | 37 | 4.70 | 18 | 4.73 | 48 |
| | | 4.61 | 5 | | |
| 4.38 | 16 | 4.37 | 15 | 4.41 | 10 |
| | | 4.11 | 5 | | |
| 3.94 | 10 | 3.95 | 13 | 3.96 | 12 |
| 3.79 | 100 | 3.80 | 63 | 3.81 | 95 |
| 3.71 | 32 | 3.71 | 18 | 3.72 | 36 |
| 3.62 | 24 | 3.62 | 25 | 3.64 | 26 |
| 3.52 | 82 | 3.52 | 55 | 3.53 | 86 |
| 3.44 | 20 | 3.44 | 15 | 3.45 | 24 |
| | | | | 3.28 | 5 |
| 3.15 | 58 | 3.15 | 55 | 3.16 | 67 |
| 3.08 | 26 | 3.09 | 25 | 3.10 | 33 |
| 3.03 | 24 | 3.04 | 20 | 3.05 | 28 |
| 2.98 | 24 | 2.98 | 23 | 3.00 | 21 |
| 2.92 | 66 | 2.92 | 63 | 2.92 | 74 |
| 2.83 | 4 | 2.83 | 4 | 2.84 | 3 |
| 2.65 | 7 | 2.65 | 14 | 2.66 | 10 |
| 2.63 | 10 | 2.625 | 9 | 2.63 | 9 |
| | | 2.55 | 2 | 2.56 | 3 |
| 2.53 | 11 | 2.52 | 8 | 2.53 | 9 |
| 2.49 | 4 | 2.48 | 3 | 2.49 | 4 |
| 2.43 | 2 | 2.43 | 2 | 2.43 | 3 |
| | | 2.40 | 2 | 2.40 | 4 |
| 2.38 | 10 | 2.375 | 6 | 2.38 | 7 |
| 2.27 | 10 | 2.275 | 10 | 2.29 | 7 |
| | | | | 2.27 | 3 |
| 2.20 | 3 | 2.20 | 1 | 2.205 | 4 |
| | | 2.16 | 2 | 2.17 | 5 |
| | | 2.14 | 4 | 2.14 | 7 |
| 2.10 | 4 | 2.10 | 3 | 2.11 | 5 |
| | | 2.08 | 1 | 2.09 | 3 |
| | | 2.03 | 1 | 2.04 | 5 |
| | | 2.015 | 2 | 2.02 | 1 |
| 1.98 | 6 | 1.985 | 6 | 1.99 | 9 |

Zeolite ZSM-4 can be suitably prepared by preparing a solution containing $R_2O$, sodium oxide, an oxide of aluminum or gallium, an oxide of silica or germanium, and water and having a composition, in terms of mole ratios of oxides, falling within the following ranges:

TABLE 2

| | Broad | Preferred |
|---|---|---|
| $\dfrac{Na_2O}{R_2O+Na_2O}$ | .31–1 | .75–.99 |
| $\dfrac{R_2O+Na_2O}{YO_2}$ | .05–.90 | .15–.75 |
| $\dfrac{YO_2}{W_2O_3}$ | 3–60 | 6–30 |
| $\dfrac{H_2O}{R_2O+Na_2O}$ | 15–600 | 20–150 | wherein R is a tetramethylammonium cation, W is aluminum or gallium and Y is silicon or germanium, and maintaining the mixture until crystals of the zeolite are formed. Thereafter, the crystals are separated from the liquid and recovered. ZSM-4 is preferably formed as an aluminosilicate. The composition can be prepared utilizing materials which supply the appropriate oxide. Such compositions include for an aluminosilicate, sodium aluminate, sodium silicate, silica hydrosol, silica gel, silicic acid, sodium hydroxide and tetramethylammonium hydroxide. It will be understood that each oxide component utilized in the reaction mixture for preparing a member of the ZSM-4 family can be supplied by one or more initial reactants. For example, sodium oxide can be supplied by an aqueous solution of sodium hydroxide, or by an aqueous solution of sodium silicate. The reaction mixture can be prepared either batchwise or continuously. Crystal size and crystallization time of the ZSM-4 composition will vary with the nature of the reaction mixture employed.

One method of preparing this new zeolitic material comprises forming an aqueous solution of the reactant mixture which solution is designated for convenience as a crystallization directing agent, or CDA, which contains sodium oxide, alumina, silica, and water. Use of this crystallization directing agent has been found to lead to better yields of ZSM-4 crystals and greater reproducibility. The CDA mixture or agent can have a composition, in terms of mole ratios of oxides, within the following ranges:

TABLE 3

|  | Broad | Preferred | Most preferred |
|---|---|---|---|
| $\frac{Na_2O}{SiO_2}$ | 1–4 | 1.5–3 | 1.85 |
| $\frac{SiO_2}{Al_2O_3}$ | 2–40 | 7–20 | 16 |
| $\frac{H_2O}{Na_2O}$ | 10–60 | 15–25 | 18 |

The crystallization directing agent mixture, is aged for a period of time of about 0.2 to 4 hours, preferably 0.5 to 2 hours, at 40 to 70° C., preferably 60° C., and mixed into a second solution containing sodium oxide, silica, and water. A third solution containing alumina and water is added to the resultant solution with stirring thereby forming a slurry. The amounts of sodium oxide, silica, alumina and water in these later solutions are such that when added to the CDA, the amounts of the various ingredients fall within the broad range of Table 2. The slurry is heated for a short period of time at about 100° C., say, between about 0.5 and 1 hour, and the resultant product is filtered. The resulting filter cake comprises an amorphous material which is mixed in its wet state with solution, e.g. an aqueous solution, of tetramethylammonium hydroxide, preferably a somewhat dilute solution of about 5 to 25% concentration, weight basis. After thorough mixing, the last-described mixture, which is in the form of a slurry, is heated over a period of time to produce a crystalline product. It is generally heated at a temperature of about 100° C. for between about 1 and 3 days. The product is then filtered, washed until the washings show a pH below 11, and dried at 100–110° C., for several hours.

When preparing the ZSM-4 catalyst, it is preferred to mix the various solutions employed in a mixing nozzle so as to effect maximum contact of the respective ingredients together. This contact in a mixing nozzle precedes heating of any resultant solution and crystallization of the aluminosilicate. This method is preferred whether or not a CDA is utilized and whether or not the tetramethylammonium compound is introduced directly into the solution or passed over the wet filter cake as discussed above. Less tetramethylammonium oxide is required to prepare ZSM-4 crystals by first preparing a wet filter cake than by the solution method normally utilized, provided sodium hydroxide is included in the tetramethylammonium ion solution to balance the electro-negative charge of the aluminosilicate tetrahedra. However, as the ratio of tetramethylammonium ions to sodium ions in the solution passed over the filter cake increases, the time of crystallization increases. Thus, if the time for crystallization of the ZSM-4 crystals is not critical, one can prepare ZSM-4 crystals employing a fraction of the amount of tetramethylammonium oxide employed in the solution method and compensating the electronegative charge of the aluminosilicate tetrahedra by increasing the sodium ion content in the solution passed over the wet filter cake proportionately.

Members of the ZSM-4 family, can be base exchanged to remove the sodium cations by such ions as hydrogen (from acids), ammonium, and alkylammonium and arylammonium including $RNH_3$, $R_3NH+$, $R_2NH_2+$ and $R_4N+$ where R is alkyl or aryl, provided that steric hindrance does not prevent the cations from entering the cage, and cavity structure of the ZSM-4 aluminosilicate composition. The hydrogen form of ZSM-4, useful in such hydrocarbon conversion processes as isomerization of poly-substituted alkyl aromatics and disproportionation of alkyl aromatics, is prepared, for example, by base exchanging the sodium form with, say, ammonium chloride or hydroxide whereby the ammonium ion is substituted for the sodium ion. The composition is then calcined at a temperature of, say, 1000° F. causing evolution of ammonia and retention of a proton in the composition. Other replacing cations include cations of the metals of the Periodic Table, especially metals other than sodium, especially metals of Group II, e.g. zinc and Group VIII of the Periodic Table and rare earth metals and manganese.

The above crystalline zeolite especially in its metal, hydrogen, ammonium, alkylammonium and arylammonium forms can be beneficially converted to another form by thermal treatment. This thermal treatment is generally performed by heating one of these forms at a temperature of at least 700° F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1600° F. at which temperature some decomposition begins to occur. The thermally treated product is particularly useful in the catalysis of certain hydrocarbon conversion reactions.

Regardless of the cations replacing the sodium in the synthesized form of the ZSM-4, the spatial arrangement of the aluminum, silicon and oxygen atoms which form the basic crystal lattice of ZSM-4, remains essentially unchanged by the described replacement of sodium or other alkali metal as determined by taking an X-ray powder diffraction pattern of the ion-exchanged material. Such X-ray diffraction pattern of the ion-exchanged ZSM-4 reveals a pattern substantially the same as that set forth in Table 1 above.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion-exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in as synthesized ZSM-4. This commercially available rare earth chloride solution contains chlorides of rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides, but having a lower cerium content. It consists of the following rare earths determined as oxides: lanthanum 45–65% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedure described in U.S. 3,140,251, 3,140,252 and 3,140,253.

The ZSM-4 zeolites are formed in a wide variety of particular sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the zeolite can be extruded before drying or dried or partially dried and then extruded.

In the case of many catalysts, it is desired to incorporate the ZSM-4 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-4, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the ZSM-4 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcine at temperautres ranging from 230° F. to 1600° F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline zeolite ZSM-4 and inorganic oxide gel matrix vary widely with the zeolite content ranging from about 1 to about 90 percent by weight and more usually, particularly when the composite is prepared in the form of beads, in the range of about 2 to about 50 percent by weight of the composite.

Catalytically active members of the family of zeolites designated as ZSM-4 possess a property of selectivity which distinguishes them from all known zeolites. Selectivity is measured as the ratio of o-xylene isomerized to that disproportionated. Selectivity designates the weight ratio of o-xylene isomerized to o-xylene disproportionated employing 200 ml. of o-xylene which has been percolated with activated alumina at 2 volumes per volume per hour at room temperature and introduced into a 1 liter steel shaker bomb containing 3.0 grams of zeolite which has been calcined, weighed out and after being weighed, dried at 900° F. for ½ hour, said bomb having been purged with nitrogen. The bomb is heated to 400° F. rapidly using an induction furnace while shaking at 200 r.p.m. using an electric driven single cylinder Lawson engine for shaking the bomb. The o-xylene is converted to conversion products, the bomb is water quenched, the shaking discontinued and the liquid sample analyzed. A complete description of apparatus to be used in determining the selectivity is disclosed in an article entitled "A New Laboratory Tool for Studying Thermal Processes" by J. W. Payne, C. W. Streed and E. R. Kent appearing in Industrial and Engineering Chemistry, volume 50, pp. 47–52 (1958). Such "selectivity" distinguishes ZSM-4 from other crystalline zeolites inasmuch as members of the ZSM-4 family are uniquely characterized by a greater selectivity than other known zeolite catalysts.

In the reaction of ortho xylene over an acidic catalyst there are two major competing hydrocarbon conversion reactions taking place, i.e. isomerization and disproportionation. The isomerization tends first to form meta xylene, and thence to proceed to para xylene. On the other hand, the disproportionation reaction tends to form a mixture of methyl benzenes, primarily toluene and trimethyl benzenes. Thus, a suitable isomerization catalyst should be one which provides the desired xylene isomers in good quantities relative to the amounts of disproportionated products obtained. The HZSM-4 catalyst has been found to provide a ratio of isomerization products to disproportionation products of at least 4 while other zeolite catalysts under the same reaction conditions were unable to achieve such high ratio. These include rare earth exchanged Linde Zeolite Y catalyst, rare earth exchanged Linde Zeolite X catalyst, HY, rare earth HY and hydrogen mordenite. As an example, the hydrogen form ZSM-4 is between 5 and 10 times more selective than a rare earth exchanged Linde Zeolite X aluminosilicate for ortho xylene isomerization. Additionally, this isomerization can be performed without impregnation into or onto the catalyst of a noble metal, such as platinum, and without employing hydrogen to assist in the isomerization. The fact that hydrogen can be dispensed with when employing the HZSM-4 catalyst for aromatic isomerization is particularly significant since the presence of hydrogen in an aromatic isomerization system, in addition to being expensive, tends to cause some saturation of the aromatic ring which results in subsequent cracking to undesired by-products. The HZSM-4 catalyst provides high selectivity at various silica-alumina mole ratios such as 5.8/1; 7/1 and 13/1.

The isomerization of psuedocumene with ZSM-4 catalyst may be carried out at temperatures between 250° F. and 1000° F. and at pressures ranging from ambient pressures or less up to about 2000 p.s.i.g. In general, the isomerization reaction will be carried out at temperatures ranging from 350° F. to 650° F. Within these limits the conditions of temperature and pressure will vary considerably depending upon equilibrium considerations and type of feed material. Optimum conditions are those in which maximum yields of desired mesitylene isomer product are obtained and hence considerations of temperature and pressure will vary within a range of conversion levels designed to provide the highest selectivity and maximum yield.

Due to the unusual selectivity and activity of ZSM-4 catalyst, it has been found that controlled isomerization reactions can be achieved at temperatures below about 600° F. on a liquid phase operation using sufficient pressure to maintain the charge material in liquid phase. The liquid phase operation is especially advantageous since high levels of activity and selectivity can be maintained for extended periods of time.

The isomerization reaction can be carried out over a wide range of liquid hourly space velocities (LHSV) within the range of 0.05 to 40. In the preferred operation the space velocity will be within the range of 0.25 to 10 since the conversion generally decreases with an increase in space velocity although selectivity is usually increased.

The amount of xylene diluent is not narrowly critical and will vary within the range of 15 to 35 weight percent based on the charge stock. Preferaby the amount of diluent is within the range of 20 to 25 weight percent.

The xylene diluent may be a single xylene isomer or a mixture of isomeric forms of xylene, e.g., ortho-xylene, meta-xylene and para-xylene.

The following examples illustrate the best mode now contemplated for carrying out the invention:

EXAMPLE I

A CDA solution was formed by dissolving 173.70 grams of 97.4 percent sodium hydroxide in 688.80 grams water and adding thereto 21.60 grams of sodium aluminate and 309.60 grams sodium silicate. Into a Waring Blendor of one gallon capacity was introduced a sodium silicate The powerstat on the Waring Blendor was turned on at a low speed of about 65 percent capacity and to the sodium silicate solution was added the CDA solution. After the CDA solution was added, an alum solution containing 213.78 grams $Al_2(SO_4)_3 \cdot 14H_2O$, 248.40 grams 96.5 percent $H_2SO_4$ and 1080.00 grams $H_2O$ was added. This caused the mixture in the Waring Blendor to thicken caused continued with the aid of a spatula. When thenate mixture was mixed thoroughly, 325.80 grams of a 25 percent aqueous solution of tetramethylammonium hydroxide was added until a smooth paste was formed. The product was poured into two 2-quart jars, sealed and placed in a 100° C. steam box. A product crystallized after 34 days. It was a ZSM-4 composition having a silica: alumina mole ratio of 13:1 and the characteristic X-ray diffraction pattern of ZSM-4 as set forth in Table 1 above.

The crystals were base exchanged with 20 wt. percent ammonium sulfate solution, washed free of sulfate, dried at 230° F. and thereafter calcined to convert the ammonium form into the hydrogen form of ZSM-4. The product analyzed 0.34 wt. percent sodium.

EXAMPLE II

A CDA solution was formed by dissolving 169.8 grams of 97.3 percent sodium hydroxide in 673.2 grams water and adding thereto 21.1 grams of sodium aluminate and 302.7 grams sodium silicate. Into a Waring Blendor of one gallon capacity was introduced a 37.3 percent sodium silicate aqueous solution containing 1188.0 grams sodium silicate. The powerstat on the Waring Blendor was turned on at a low speed of about 65 percent capacity and to the sodium silicate solution was added the CDA solution. After the CDA solution was added, an alum solution containing 209.0 grams $Al_2(SO_4)_3 \cdot 14H_2O$, 176.0 grams 96.5 percent $H_2SO_4$ and 960 grams $H_2O$ was added. This caused the mixture in the Waring Blendor to thicken. Mixing continued with the aid of a spatula. When the mixture was mixed thoroughly, 665.5 grams of a 24 percent aqueous solution of tetramethylammonium hydroxide was added until a smooth paste was formed. The contents were placed in a bottle and heated to 100° C. After 30 hours a product crystallized. It was a ZSM-4 composition having a silica: alumina mole ratio of 7.7:1 and the characteristic X-ray diffraction pattern of ZSM-4 as set forth in Table 1 above.

The crystals were base exchanged with ammonium chloride, washed free of chloride, dried at 230° F. and thereafter calcined at 1000° F. to convert the ammonium form of ZSM-4 into the hydrogen form. The product analyzed 0.21 wt. percent sodium.

EXAMPLE III

A feed mixture of 80% 1,2,4-trimethylbenzene and 20% o-xylene was passed at 600° F. and 1/1 LHSV over a catalyst as prepared in accordance with Example II which had been partially inactivated by two previous experimental runs. The results are shown in Table 4.

EXAMPLE IV

The feed mixture of Example III was passed over the same catalyst at 550° F. and 1/1 LHSV. The results, shown in Table 4 demonstrate that lower temperatures are preferable and indicate that at optimum temperature very little trimethylbenzene is likely to be lost.

EXAMPLE V

Using a 2 cc. reactor, a feed mixture of 25 weight percent o-xylene and 75 weight percent pseudocumene (1,2,4-trimethylbenzene) was passed continuously over the catalyst prepared in Example II at 400° F. and 600 p.s.i.g. and at a feed rate of 1/1 LHSV for five days. During this time, numerous samples were analyzed with a gas chromatograph. The product analysis, taken at 99% of equilibrium, is shown in Table 4.

The 1% drop in total trimethylbenzenes indicates that the reactor temperature was still slightly too high. It was estimated that a further drop to 385° F. would probably result in 100% recovery of the trimethylbenzenes with very little loss in conversion to mesitylene.

EXAMPLE VI

Using the 2 cc. reactor with fresh catalyst, as prepared in Example II, a feed consisting of 100% pseudocumene was similarly isomerized continuously at 400° F., 600 p.s.i.g., and a flow rate of 1/1 LHSV according to gas chromatographic computer analysis. The product at 99% of equilibrium, as listed in Table 4, shows that about 15 weight percent of trimethylbenzene was lost because of disproportionation to $C_8$ and $C_{10}$.

Additional attempts were made to isomerize pseudocumene without adding xylenes and at temperatures less than 400° F. It was found that mesitylene was produced in smaller quantities while larger recoveries of trimethylbenzene were obtained. It appeared impossible to isomerize pseudocumene without appreciable disproportionation to $C_8$ and $C_{10}$ compounds unless xylenes were added. A mixture of xylenes was also found to be as satisfactory as a single xylene isomer. Addition of toluene as the diluent instead of xylene resulted in the formation of large amounts of xylenes from transalkylation.

TABLE 4

| Example | <$C_6$ | Benzene | Toluene | Ethylbenzene | Xylenes | | | | Trimethylbenzenes | | | | $C_{10}$ |
|---|---|---|---|---|---|---|---|---|---|---|---|---|---|
| | | | | | o | m | p | Total | 1,2,3 | 1,2,4 | 1,3,5 | Total | |
| 3 | 0.38 | 0.20 | 3.95 | 0.02 | 5.83 | 13.00 | 5.32 | 24.2 | 8.5 | 42.2 | 20.2 | 70.9 | 0.4 |
| 4 | 0.19 | 0.27 | 2.60 | <0.01 | 8.08 | 8.80 | 2.66 | 19.5 | 6.6 | 54.6 | 16.1 | 77.3 | 0.1 |
| 5 | | | 0.7 | | | | | 24.4 | | | 20.1 | 74.2 | 0.6 |
| 6 | | | 0.3 | | | | | 6.1 | | | 24.6 | 86.7 | 7.0 |

What is claimed is:
1. In a process for isomerizing psuedocumene to mesitylene in the presence of a crystalline aluminosilicate zeolite, the improvement of carrying out the isomerization reaction in the presence of 15 to 35 weight percent xylene.

2. The process of claim 1 wherein the zeolite has the X-ray powder diffraction pattern as set forth in Table 1 of the specification and a composition in terms of mole ratios of oxides, as follows:

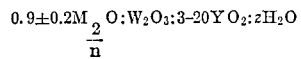

wherein M is a cation, $n$ is the valence of said cation, W is selected from the group consisting of aluminum and gallium, Y is selected from the group consisting of silicon and germanium and $z$ is between 0 and 20.

3. The process of claim 2 wherein M is selected from the group consisting of alkylammonium and arylammonium, metals, ammonium and hydrogen.

4. The process of claim 3 wherein the zeolite has been subjected to thermal treatment.

5. A process for effecting catalytic isomerization of psuedocumene to mesitylene which comprises contacting psuedocumene at a temperature within the range of 250° F. and 1000° F. at a pressure of up to about 2000 p.s.i.g. at a liquid hourly space velocity within the range of 0.05 to 40 in the presence of a xylene diluent and a crystalline zeolite composition having a composition, in terms of mole ratios of oxides, as follows:

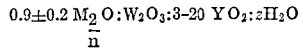

wherein M is a cation, $n$ is the valence of said cation, W is selected from the group consisting of aluminum and gallium, Y is selected from the group consisting of silicon and germanium and $z$ is betwene 0 and 20.

6. The process of claim 5 wherein the conversion is carried out at a temperature within the range of 350° F. to 650° F.

7. The process of claim 5 wherein the conversion is carried out at a temperature within the range of 500° F. to 800° F.

References Cited
UNITED STATES PATENTS

| | | | |
|---|---|---|---|
| 3,293,314 | 12/1966 | Brodbeck | 260—668 A |
| 3,377,400 | 4/1968 | Wise | 260—668 A |
| 3,409,685 | 11/1968 | Donaldson et al. | 260—668 A |
| 3,409,686 | 11/1968 | Mitsche | 260—668 A |

CURTIS R. DAVIS, Primary Examiner

U.S. Cl. X.R.

260—672 T

UNITED STATES PATENT OFFICE
CERTIFICATE OF CORRECTION

PO-1050
(5/69)

Patent No. 3,637,880  Dated January 25, 1972

Inventor(s) George T. Burress

It is certified that error appears in the above-identified patent and that said Letters Patent are hereby corrected as shown below:

Column 2, lines 62 to 70, Table 1, should read:
```
9.1+.2 --------------- vs
7.94∓.1 --------------- mw
6.90∓.1 --------------- m
5.97∓.07 -------------- s
5.50∓.05 -------------- mw
5.27∓.05 -------------- mw
4.71∓.05 -------------- mw
```

Column 3, lines 1 to 14, Table 1, should read:
```
4.39+.05 -------------- w
3.96∓.05 -------------- w
3.80∓.05 -------------- s
3.71∓.05 -------------- m
3.63∓.05 -------------- m
3.52∓.05 -------------- s
3.44∓.05 -------------- m
3.16∓.05 -------------- s
3.09∓.05 -------------- m
3.04∓.05 -------------- m
2.98∓.05 -------------- m
2.92∓.05 -------------- s
```

Column 9, line 25, "sodium silicate" should be --sodium silicate aqueous solution containing 1215.00 grams sodium silicate.--

Column 9, line 32, "thicken" should be --thicken.--;
Column 9, line 33, "caused" should be --Mixing--, "thenate" should be --the--.

Column 12, line 4, "betwene" should be --between--.

Signed and sealed this 13th day of June 1972.

(SEAL)
Attest:

EDWARD M. FLETCHER, JR.
Attesting Officer

ROBERT GOTTSCHALK
Commissioner of Patents